(12) United States Patent
Dawson, Jr. et al.

(10) Patent No.: US 6,454,313 B1
(45) Date of Patent: Sep. 24, 2002

(54) CONNECTOR FOR MISALIGNED TUBULARS

(75) Inventors: George Dawson, Jr.; John W. Aaron, III, both of Houston, TX (US)

(73) Assignee: Specialty Piping Components, Inc., Houston, TX (US)

( * ) Notice: Subject to any disclaimer, the term of this patent is extended or adjusted under 35 U.S.C. 154(b) by 0 days.

(21) Appl. No.: 09/496,568

(22) Filed: Feb. 2, 2000

Related U.S. Application Data

(60) Provisional application No. 60/118,414, filed on Feb. 2, 1999.

(51) Int. Cl.[7] ............................................... F16L 27/04
(52) U.S. Cl. ................... 285/261; 285/334.3; 285/270; 285/266
(58) Field of Search .................. 285/261, 271, 285/270, 266, 334.3

(56) References Cited

U.S. PATENT DOCUMENTS 6,328,347 B1 * 12/2001 Reder et al. ................. 285/261

* cited by examiner

Primary Examiner—Lynne H. Browne
Assistant Examiner—Aaron Dunwoody
(74) Attorney, Agent, or Firm—Gray Cary Ware & Freidenrich

(57) ABSTRACT

A connector for coupling pipe sections which may be either aligned or misaligned axially, the connector having a male fitting, a female fitting which mates with the male fitting and a retaining means which can be connected to the female fitting to hold the male fitting in place against the female fitting. In one embodiment, the retaining means comprises a hammer nut which has a retaining surface. The retaining surface of the hammer nut contacts a rear surface of a first one of the flanges for urging this flange forward. The hammer nut has threads which are complementary to a set of threads on the second flange. When the hammer nut is threaded onto the second flange, the first and second flanges are pulled together. The retaining surface of the hammer nut and the rear surface of the first flange have complementary spherical shapes so that the hammer nut can rotate and swivel with respect to the flange. The hammer nut can therefore be aligned with the second flange and threaded onto it, even though the first and second flanges are misaligned.

3 Claims, 3 Drawing Sheets

CONNECTOR FOR MISALIGNED TUBULARS

RELATED APPLICATIONS

This application claims priority from U.S. provisional patent application Serial No. 60/118,414 filed Feb. 2, 1999, which is hereby incorporated by reference as if set forth herein in its entirety.

BACKGROUND OF THE INVENTION

1. Field of the Invention

The invention relates generally to methods and devices for connecting tubing or pipelines, and more particularly to methods and devices for enabling sections of tubing or pipe to be connected when the sections are axially misaligned.

2. Description of the Related Art

Pipelines are commonly used to carry fluids under pressure. For the purposes of this disclosure, the words "pipe" and "pipeline" are intended to include both the heavier tubular sections commonly referred to in the art as "pipe" and the somewhat lighter tubular sections commonly referred to "tubing." The pipelines used in these applications typically consist of a number of pipe sections which are connected end-to-end to form a single conduit. In many cases, adjoining pipe sections are axially aligned so that they can be connected by means of standard flanges at the respective ends of the pipes which are bolted together.

A hammer union is one type of connector that is used to couple pipe sections together. One of the reasons that hammer unions are used is that they have fewer parts than bolted flanges and are easier to assemble. A hammer union generally comprises a first flange, a second flange and a hammer nut. The first and second flanges each have a sealing face and which is configured to form a seal when secured against the other's sealing face. The hammer nut fits against the rear of the second flange to hold it against the first flange. The first flange is threaded to mate with a set of complementary threads on the hammer nut. Hammer unions may range in size from an inch or less to tens of inches in diameter.

The hammer nut typically has protrusions, or tangs, which can be hammered to twist the nut and thread it onto or off of the first flange. The aperture through the hammer nut may be small enough that the nut cannot fit over the second flange, or it may be large enough that the second flange can pass entirely through it. In the first instance, the nut must be placed on the pipe to which the second flange is connected from the end opposite the flange. Alternately, the flange may be placed on the pipe before the flange is connected to the pipe (e.g., by welding.) The nut is then moved along the pipe into contact with the flange so that it fits against the back of the flange. In the second instance, where the flange can fit through the aperture, slips are needed to retain the nut against the back of the second flange. The nut can be placed over the flange so that it is behind the flange's rear surface, then the slips are inserted between the pipe and the nut. When the nut is moved forward against the second flange, the slips fits between the nut and flange so that the nut can hold the flange against a first flange.

In some cases, adjoining pipe sections and the flanges at the ends of the pipe sections may be misaligned. This may occur, for example, in marine environments, where it may not be possible to keep the pipe sections aligned when they are laid, or they may become misaligned due to environmental forces or repairs on the pipeline. The hammer nut in a hammer union, however, is normally designed to fit tightly against the back of the second flange and it cannot be threaded onto the first flange if the pipes and flanges are misaligned. This defeats the purpose of providing the hammer union, which is normally easier to assemble than a flange which has a set of bolts which have to be installed around its perimeter. Even if the nut of a hammer union could be threaded onto a misaligned flange, misalignment of the flange faces could prevent a proper seal from being made between them.

SUMMARY OF THE INVENTION

One or more of the problems outlined above may be solved by various embodiments of the connector disclosed herein. One embodiment comprises a hammer union for connecting pipe sections which may be either aligned or misaligned axially. The hammer union has a first flange, a second flange which mates with the first flange and a hammer nut (a retaining nut) which contacts the back of the second flange and is connected to the first flange to hold the flanges in place against each other. The back surface of the second flange and the inner surface of the retaining nut are complementary spherical surfaces which allow the nut to swivel with respect to the second flange. Therefore, when the first and second flanges are not axially aligned, the retaining nut can be swiveled to align with the first flange and can then be threaded onto the first flange.

In one embodiment, the first flange has a female mating surface and the second flange has a male mating surface. The mating surfaces are tapered (i.e., conical sections) and the male surface is tapered at a slightly greater angle than the female surface. A tapered sealing ring is placed between the male and female surfaces to provide a good seal, even when the mating surfaces of the two flanges are not completely aligned. The sealing ring is constructed of metal to enable it to withstand high pressures, high temperatures, dangerous fluids and other properties which may be found in industrial applications. The use of the tapered mating surfaces and the tapered sealing ring allow the flanges to provide a good seal even if there is some axial misalignment of the flanges. When the retaining nut is tightened, the forces on the flanges urge the flanges toward axially aligned positions.

In one embodiment, the retaining nut has tangs which extend outward from the body of the nut to facilitate the tightening or loosening of the nut. In smaller embodiments, this allows the nut to be more easily rotated by hand. In larger embodiments, the tangs allow the nut to be rotated by striking the tangs (e.g., with a hammer.) Slips or retainers may be used to allow the nut to be placed over the second flange and then held on the pipe section connected to the second flange. When slips are used, they provide the spherical retaining surface of the retaining nut.

In one embodiment, the male flange has a convex spherical mating surface and the seal ring has a complementary concave spherical inner surface. The male flange and the seal ring maintain contact and can provide a good seal while still allowing the male flange and the seal ring to swivel with respect to each other.

BRIEF DESCRIPTION OF THE DRAWINGS

Other objects and advantages of the invention will become apparent upon reading the following detailed description and upon reference to the accompanying drawings in which.

Figure 1:
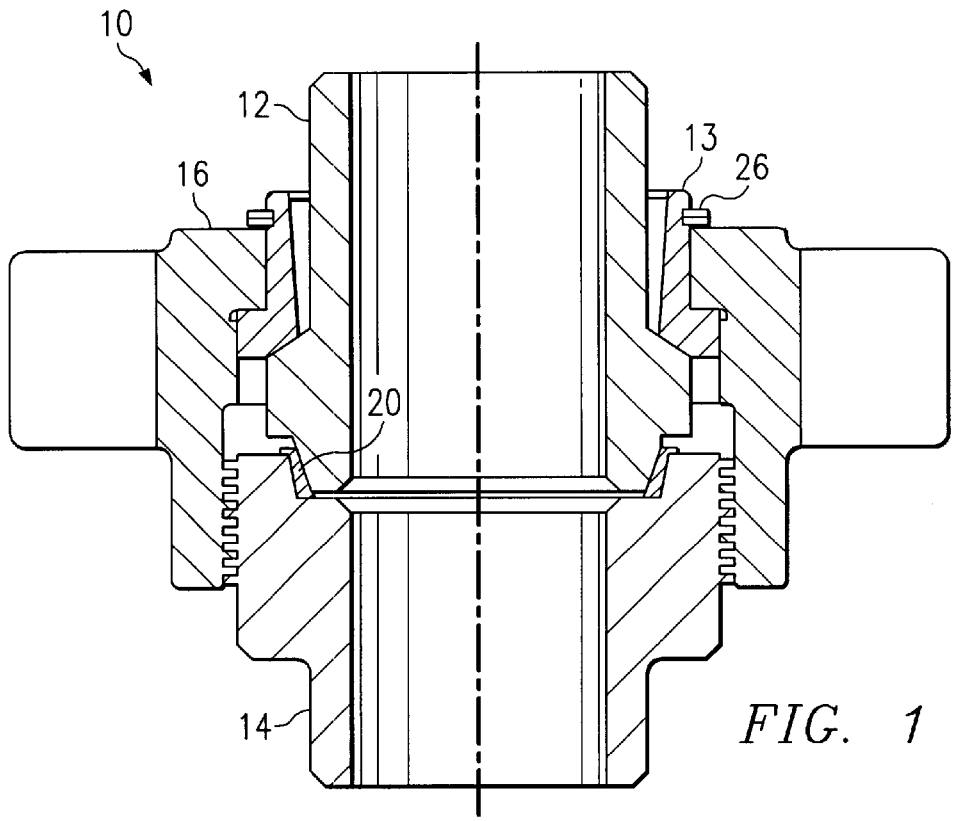
FIG. 1 is a cross-sectional view of an assembled and tightened hammer union in one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention.

DETAILED DESCRIPTION OF THE PREFERRED EMBODIMENT

One embodiment of the invention is described in detail below. The description of this embodiment is intended to be illustrative rather than limiting. This embodiment comprises a tapered seal hammer union. Each of the flanges has a mating surface which includes a tapered (conical) surface. A tapered seal ring is disposed between the tapered surfaces of the flanges to provide a good seal. The flanges are secured together by a retaining nut which is placed against the back of one of the flanges and is threaded onto the other flange. In this embodiment, the retaining nut has tangs that extend radially outward from the nut to provide a surface which a user can strike (with a hammer or other tool) to rotate the nut and thereby tighten or loosen the nut.

Figure 2:
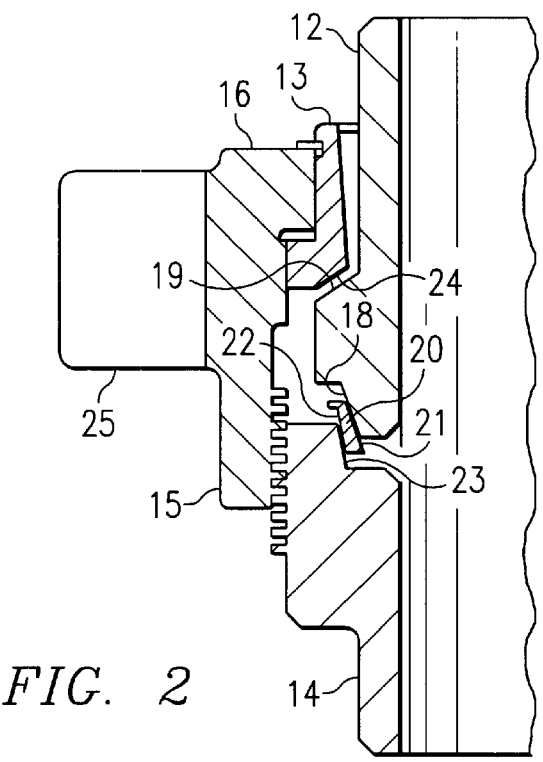
FIG. 2 is a partial cross-sectional view of a loosely assembled hammer union in one embodiment.

Referring to FIGS. 1 and 2, cross-sectional views of the hammer union are shown. FIG. 1 shows the entire hammer union in an assembled and tightened configuration. FIG. 2 shows only a portion of the hammer union in a partially assembled and untightened configuration. The hammer union is indicated generally as 10. The main components of hammer union 10 include male fitting 12, female fitting 14 and retaining nut 16. Male fitting 12 has a front flange surface 18 and a rear surface 19. Front flange surface 18 is tapered and is generally convex. That is, front flange surface 18 comprises an outward-facing conic section. Female fitting 14 has a generally concave tapered surface 23 (i.e., an inward-facing conic section.) Surfaces 18 and 23 are essentially complementary so that they can be matingly engaged. (It should be noted that surfaces 18 and 23 are configured to accommodate tapered seal ring 20 therebetween, and that "mating engagement" between the two surfaces does not imply direct contact between them.)

As indicated above, seal ring 20 is installed between surfaces 18 and 23 to provide a good seal. An inner surface 21 of the seal ring matches the taper angle of surface 18 of male fitting 12. An outer surface 22 of the seal ring matches the taper angle of surface 23 of female fitting 14. The inner and outer surfaces of seal ring 20 or tapered at slightly different angles so that the seal ring itself is tapered in cross-section, with the thicker end toward the interior of the connection. When the connection is pressurized, the pressure internal to the connection forces seal ring 20 to be waged more tightly into the gap between surfaces 18 and 23. That tapered seal ring also has the advantage of being able to provide a good seal even when surfaces 18 and 23 are not exactly aligned axially.

It should be noted that, while the use of tapered seal ring 20 is preferred (to ensure a good seal in the union,) it is not strictly necessary. In an alternate embodiment, inner surface 21 of seal ring 20 comprises a spherical section rather than a conic section. In such an embodiment, surface 18 of male fitting 12 has a spherical surface complementary to that of the seal ring. In yet another embodiment, the flanges may be coupled together without having a seal ring between them.

Retaining nut 16 has a forward portion 15 which is internally threaded in order to mate with corresponding external threads on female fitting 14. When retaining nut 16 is in contact with male fitting 12, the forward portion of the retaining nut extends forward, generally beyond surface 18. (It is not necessary that the forward portion of the retaining nut extend beyond the mating surface of the male flange, but it should extend forward sufficiently to thread securely onto the female fitting.)

Male fitting 12 has a back surface 19 which is configured to be engaged by retaining nut 16. Retaining nut 16 urges male fitting 12 forward, toward female fitting 14. In FIGS. 1 and 2, retaining nut 16 actually acts cooperatively with slips 13 to urge the fitting forward. Slips 13 have a retaining surface 24 which is a concave spherical surface. Male fitting 12 has a rear surface 19 which has a complementary convex spherical shape. When retaining nut 16 is tightened, retaining surface 24 is drawn into contact with rear surface 19, thereby urging the male fitting forward (i.e., toward the female fitting.)

It should be noted that, in this embodiment, slips are used to allow the retaining nut to be installed by placing it over the flange and then inserting the slips into the aperture of the nut. The slips are held in place by a retaining clip 26. (In other embodiments, it may be sufficient to hold the slips in place simply by keeping the retaining nut in place against the rear surface of the fitting, so clip 26 may not be necessary.) The slips effectively reduce the diameter of the aperture through the nut so that it cannot be removed. That is, the flange can no longer pass through the center of the nut, so the nut is retained behind the flange. In other embodiments, which most likely are small-scale unions, slips may not be necessary because it may be possible to slide the nut onto the other end of the pipe and move it to a position behind the flange. In embodiments which do not use slips, retaining surface 24 is provided on the body of the retaining nut itself. It should be noted that the aperture formed by slips 13 tapers away from male fitting 12, forming a conical section. This shape serves two purposes: it provides room to allow the neck of male fitting 12 to swivel; and it provides a stop which prevents male fitting 12 from swiveling by more than a predetermined angle.

Because both back surface 19 and retaining surface 24 are generally spherical, retaining nut 16 can swivel with respect to male fitting 12 in addition to rotating around the fitting. ("Swivel" is used herein to refer to movement of the retaining nut other than rotation, and may be characterized by movement of the centerline of the nut with respect to the centerline of the flange.) The swiveling of the nut against the flange allows the centerline of the nut to be aligned with the centerline of the threaded flange (the female flange in the embodiment of FIGS. 1 and 2.) The retaining that can therefore be aligned with and screwed onto the threaded flange when the two flanges (and their respective pipe sections) are misaligned. (It should be noted that, although FIGS. 1 and 2 depict an embodiment in which the retaining nut is threaded onto the female fitting, other embodiments may reverse the male and female fittings so that the retaining nut is onto threads on the male fitting.) In the embodiment of FIGS. 1 and 2, retaining nut 16 and female fitting 14 have flat bottom threads. Flat bottom threads are preferable because they provide stronger engagement between the retaining nut and the threaded flange. These threads provide sufficient strength to withstand from low-pressure (approximately 5000 psi) to high-pressure (approximately 15,000 psi) at the connection. In high-pressure applications, the threads preferably have a very fine pitch to allow the flanges to be tightly drawn together by applying a relatively low torque to the retaining nut. It should be noted that, in other embodiments, other types of threads can be used. Further, as will be described in more detail below, means for connecting the flanges other than threaded couplings may also be employed.

In embodiment of FIGS. 1 and 2, retaining nut 16 is a hammer nut. That is, retaining nut 16 includes several tangs 25 which extend radially outward from the body of the retaining nut. Tangs 25 can be struck with a hammer or other tool to rotate retaining nut 16 with respect to female fitting 14 and thereby thread retaining nut 16 onto or off of female fitting 14. In smaller embodiments, the tangs may simply make it easier for a person to rotate the nut by hand. This may be convenient where it is difficult to grip the nut (e.g., when it is necessary to wear gloves,) or where additional torque is needed to sufficiently tighten the nut by hand. It should be noted that tangs 25 are not necessary to the retaining nut 16 and may be omitted.

The use of retaining nut 16 to hold male fitting 12 and female fitting 14 in mating engagement provides a simple means for connecting two pipe sections. The threaded design of retaining nut 16 and female fitting 14 eliminate the flanges and bolts needed to hold together prior art connectors. This results in fewer pieces in the connector and potentially lower design and manufacturing costs. Because the use of retaining nut 16 eliminates the need for the nuts and bolts required to hold together the flanges of prior art connectors, this design also eliminates some of the time required to individually tighten each of the bolts.

The first step in installing hammer union 10 is connecting the flanges to two pipe sections. The flanges are typically to the pipe sections by welding. The pipe sections are then positioned with the flanges in close proximity to each other. using the embodiment illustrated in FIGS. 1 and 2, the retaining nut is placed over the male fitting and into a position behind the fitting. The slips are then inserted into the aperture of the nut and a retaining clip is installed to hold the slips in place. This retains the nut on the pipe.

The ends of male fitting 12 and female fitting 14 are then brought together so that the threads of retaining nut 16 can engage the threads of female fitting 14. As the threads are engaged, the flange surfaces of the male and female fittings are brought into mating engagement (either through direct surface-to-surface contact, not shown in FIG. 1, or through contact with sealing ring 20, as depicted in the figure). After the male and female fittings are matingly engaged, threading retaining nut 16 further onto female fitting 14 serves to draw the flange surfaces of the male and female fittings closer together. As the surfaces are drawn together, they are urged toward axially aligned positions. If necessary, the tightening of retaining nut 16 can be accomplished by striking the tangs of the nut. Even if the flanges cannot be completely aligned, the tapered seal ring is configured to provide a good seal. Disassembly or realignment of the connector is accomplished by reversing this procedure and re-tightening, if necessary.

Figure 3:
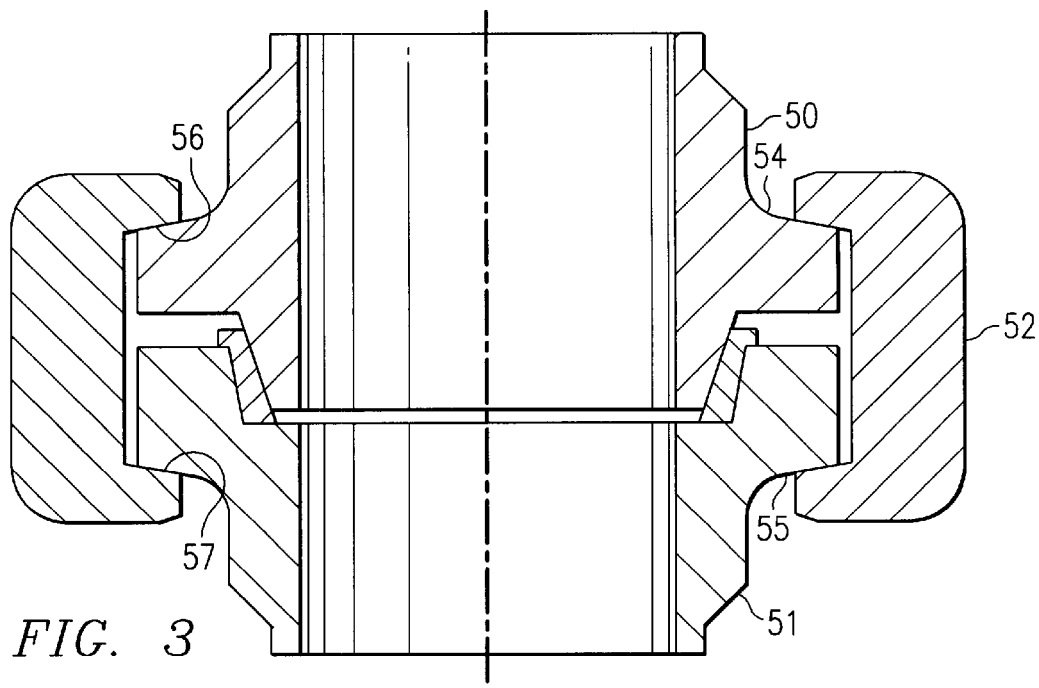
FIG. 3 is a cross-sectional view of an alternate embodiment of a union.

Referring to FIG. 3, an alternate embodiment of a connector is shown. In this embodiment, male fitting 50 is held in mating engagement with female fitting 51 by clamp 52. Clamp 52 is a clamshell-type clamp which consists of two semicircular pieces that are typically bolted together. Male fitting 50 and female fitting 51 each has a retaining surface 54, 55. Clamp 52 has complementary surfaces 56 and 57. As the halves of clamp 52 are drawn together, surfaces 56 and 57 move radially inward against retaining surfaces 54 and 55, drawing the male and female fittings together. Surfaces 54, 55, 56 and 57 are preferably radiused rather than being simple conical sections. The surfaces are radiused in such a way that, when the male and female fittings are misaligned, the clamp maintains engagement with retaining surfaces 54 and 55 and shifts away from the misalignment. That is, when the fittings are misaligned, surfaces 54 and 55 are closer together on one side (the side toward the misalignment) and farther apart on the opposite side (the side away from the misalignment), causing the clamp (which has a fixed distance between surfaces 56 and 57) to shift away from the misalignment. The shape of surfaces is designed to maximize surface contact between surfaces 54–57, when such misalignment occurs.

Figure 4:
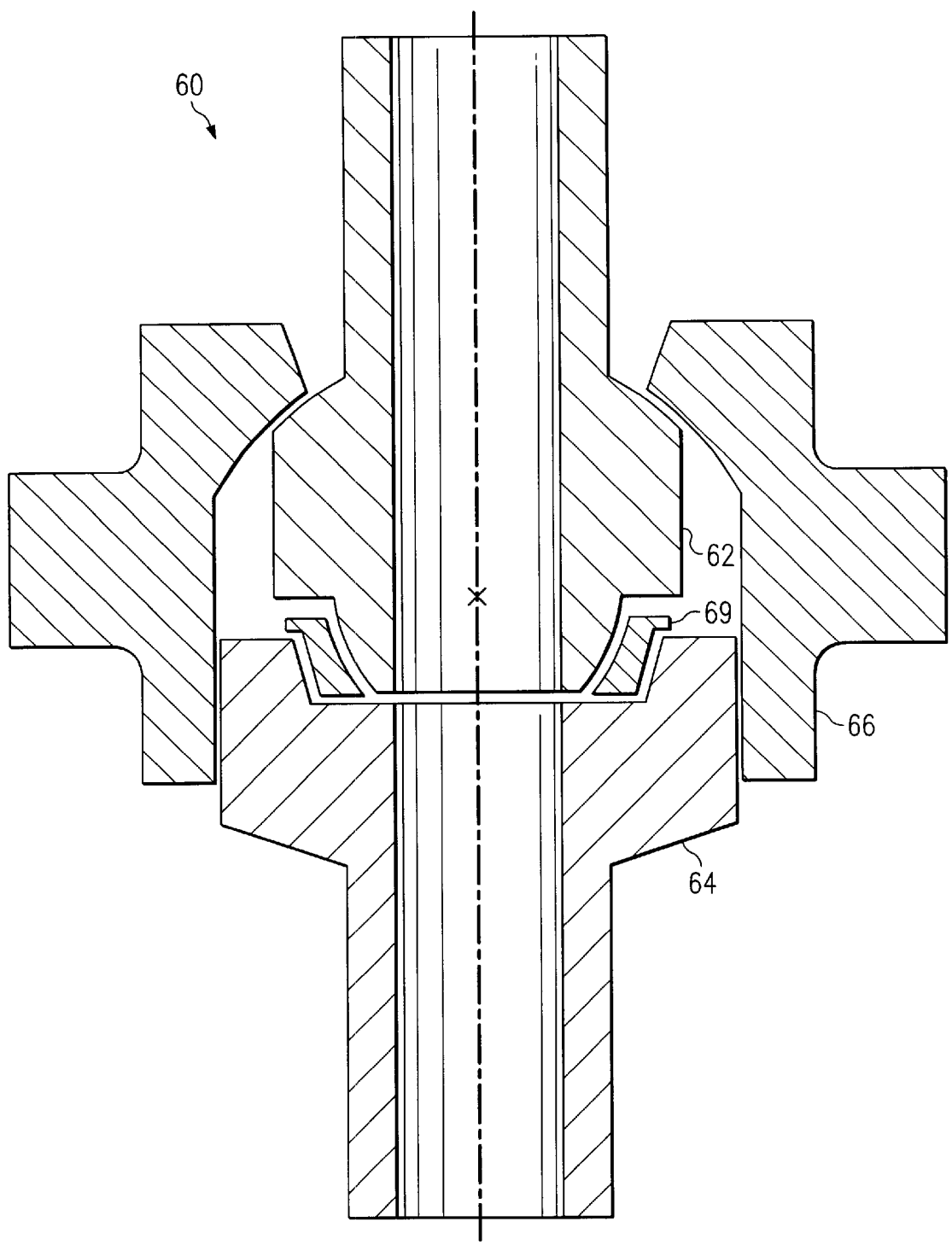
FIG. 4 is a cross-sectional view of an alternate embodiment of a hammer union.

FIG. 4 shows a cross-sectional view of a hammer union in an alternate embodiment. The hammer union 60 comprises a male fitting 62, a female fitting 64, a hammer nut 66 and a seal ring 69. In this embodiment, slips are not used to retain hammer nut 66 on the male fitting. Hammer nut 66 is instead retained on the male fitting by using an aperture through the nut which is small enough that the male fitting cannot fit through the aperture. As indicated above, this type of hammer nut must be installed before the male fitting is connected to the respective pipe section, or it must be installed from the opposite end of the pipe section. It can also be seen from FIG. 4 that the inner surface of seal ring 69 and the mating surface of male fitting 62 are spherical.

Figure 5:
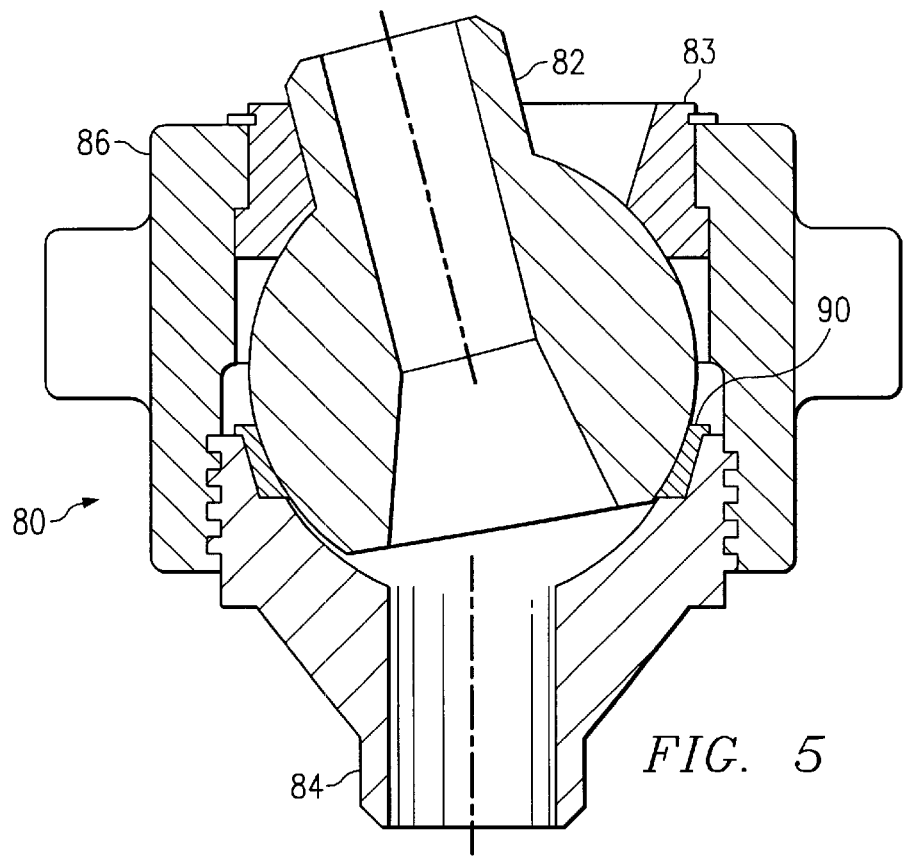
FIG. 5 is a cross-sectional view of another alternate embodiment of a hammer union.

FIG. 5 shows a cross-sectional view of a hammer union in another alternate embodiment. The hammer union 80 comprises a male fitting 82, a female fitting 84 and a hammer nut 86. Slips 83 are used to provide a retaining surface with which hammer nut 86 contacts the rear surface of male fitting 82 to urge the fitting forward. Seal ring 90 is positioned between male fitting 82 and female fitting 84 to provide a seal in the union. It can be seen from the figure that the inner surface of seal ring 90 and the forward surface of male fitting 82 are spherical. In fact, the forward and rear surfaces a male fitting 82 form a continuous spherical section. It should be noted that, while this embodiment allows a user to thread hammer nut 86 onto female fitting 84 when the male and female fittings are misaligned, the fittings are not urged into alignment when the nut is tightened onto the fitting. Instead, the fittings are locked into their relative positions so that, if the fittings are misaligned, they will remain misaligned. If they are aligned, they will remain aligned.

While the present invention has been described with reference to particular embodiments, it will be understood that the embodiments are illustrative and that the invention scope is not limited to these embodiments. Many variations, modifications, additions and improvements to the embodiments described are possible and many will be evident to a person of ordinary skill in the art of the invention. These variations, modifications, additions and improvements are contemplated to be within the scope of the invention.

What is claimed is:

1. A connector comprising:
    a first flange configured to be connected to a first pipe section, said first flange having a first set of threads and a first flange face;
    a second flange configured to be connected to a second pipe section, said second flange having a second flange face configured to form a seal with said first flange face;
    a retaining nut having a second set of threads complementary to said first set of threads, wherein said retaining nut is configured to be threaded onto said first flange and to thereby secure said second flange against said first flange;

wherein said second flange has a rear surface opposite said second flange face, wherein said rear surface is spherical;

wherein said retaining nut has a spherical retaining surface which contacts said rear surface of said second flange;

wherein said retaining nut is configured to rotate and swivel with respect to said rear surface of said second flange and thereby enable said retaining nut to be threaded onto said first flange when said first and second flanges are axially misaligned, and wherein said retaining nut comprisesan annular body having a first aperture therethrough, wherein said aperture is configured to allow said second flange to pass therethrough, and a plurality of slips configured to fit within said first aperture to prevent said second flange from passing through said first aperture, wherein said slips form at least a portion of said retaining surface.

2. The connector of claim 1 wherein said slips form a second aperture having a generally conical shape.

3. The connector of claim 2 further comprising one or more retainer rings configured to hold said slips in position within said first aperture.

* * * * *